(12) United States Patent
Bremer

(10) Patent No.: US 8,534,541 B2
(45) Date of Patent: Sep. 17, 2013

(54) DEVICES HAVING AN AUXILIARY ELECTRONIC PAPER DISPLAY FOR DISPLAYING OPTICALLY SCANNABLE INDICA

(75) Inventor: Edward C. Bremer, Victor, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/172,020

(22) Filed: Jun. 29, 2011

(65) Prior Publication Data

US 2013/0005404 A1    Jan. 3, 2013

(51) Int. Cl.
*G06F 17/00* (2006.01)

(52) U.S. Cl.
USPC .................. 235/375; 235/462.01; 235/472.01; 235/487

(58) Field of Classification Search
USPC .................. 235/375, 462.01, 472.01, 472.02, 235/487, 492
See application file for complete search history.

(56) References Cited

U.S. PATENT DOCUMENTS

| | | | |
|---|---|---|---|
| 7,044,362 B2 | 5/2006 | Yu | |
| 7,140,550 B2 | 11/2006 | Ramachandran | |
| 7,891,569 B2 | 2/2011 | Gelbman | |
| 2002/0158812 A1 | 10/2002 | Pallakoff | |
| 2006/0187142 A1 | 8/2006 | Lesniak | |
| 2008/0072163 A1 | 3/2008 | Teng et al. | |
| 2008/0195536 A1 | 8/2008 | Karns et al. | |
| 2009/0026267 A1 | 1/2009 | Wang et al. | |
| 2009/0072038 A1 | 3/2009 | Li et al. | |
| 2010/0030592 A1 | 2/2010 | Evans et al. | |
| 2010/0078477 A1 | 4/2010 | Wang et al. | |
| 2010/0090007 A1 | 4/2010 | Wang et al. | |
| 2010/0108769 A1 | 5/2010 | Wang et al. | |
| 2010/0125497 A1 | 5/2010 | Arguello | |
| 2010/0147956 A1 | 6/2010 | Wang et al. | |
| 2010/0149187 A1 | 6/2010 | Slavin et al. | |
| 2010/0184485 A1* | 7/2010 | Kim .............................. | 455/566 |

(Continued)

FOREIGN PATENT DOCUMENTS

| | | |
|---|---|---|
| EP | 1826739 | 8/2007 |
| EP | 2226787 A2 | 9/2010 |
| WO | 2006097865 | 9/2006 |
| WO | 2008065610 | 6/2008 |
| WO | 2008084549 | 7/2008 |

OTHER PUBLICATIONS

Van Volkinburg et al., U.S. Appl. No. 12/957,971, filed Dec. 1, 2010, entitled "Terminal With Screen Reading Mode".

(Continued)

*Primary Examiner* — Ahshik Kim
(74) *Attorney, Agent, or Firm* — Heslin Rothenberg Farley & Mesiti P.C.

(57) ABSTRACT

A portable electronic device includes a housing, a first display operably coupled to the housing, and a second display comprising an electronic paper display operably coupled to the housing. A processor is operably coupled to the first display and to the second electronic paper display. A wireless receiver is coupled to the processor for receiving data comprising, for example, an electronic ticket having a scannable optical indicia, and the processor and the second electronic paper display are operable to display of the optically scannable indicia on the electronic paper display. The second electronic paper display is operable to display the optically scannable indicia such as a barcode with at least one of a lower reflectance, a higher resolution, and a higher contrast compared to display of the optically scannable indicia on the first display.

27 Claims, 6 Drawing Sheets

(56) References Cited

U.S. PATENT DOCUMENTS

| | | |
|---|---|---|
| 2010/0219234 A1 | 9/2010 | Forbes |
| 2010/0309095 A1 | 12/2010 | Chang et al. |
| 2011/0080417 A1 | 4/2011 | Lin et al. |
| 2011/0090166 A1 | 4/2011 | Truter |
| 2011/0148750 A1* | 6/2011 | Ayala ............................ 345/107 |

OTHER PUBLICATIONS

Van Volkinburg et al., U.S. Appl. No. 13/017,926, filed Jan. 31, 2011, entitled "Terminal With Flicker-Corrected Aimer and Alternating Illumination".

Jovanovski et al., U.S. Appl. No. 12/981,793, filed Dec. 30, 2010, entitled "Terminal Having Illumination and Exposure Control".

Motorola FONE F3, manufactured by Motorola, printout available online on Jun. 11, 2011, at http://en.wikipedia.org/wiki/Motorola_FONE_F3, 6-pages, Nov. 2006.

Samsung SCH-U750, manufactured by Samsung, printout available online on Jun. 28, 2011, at http://en.wikipedia.org/wiki/Samsung_SCH-U750, 2-pages, May 2009.

Jan. 22, 2013 Communication pursuant to Article 94(3) EPC in European Application No. 12173071.1.

Nov. 22, 2012 European Search Report in European Application No. 12173071.7.

\* cited by examiner

DEVICES HAVING AN AUXILIARY ELECTRONIC PAPER DISPLAY FOR DISPLAYING OPTICALLY SCANNABLE INDICA

FIELD OF THE INVENTION

This disclosure relates generally to portable electronic devices, and more specifically, to portable electronic devices having an auxiliary electronic paper display for displaying optically scannable indicia such as for use in electronic ticket handling

BACKGROUND OF THE INVENTION

Mobile ticketing includes the buying and selling of tickets such as movie tickets, concert tickets, airline tickets, using mobile phones. After purchase of a ticket, an electronic ticket having a barcode is sent to a buyer's mobile phone. To gain entry, the buyer retrieves the electronic ticket for display on their mobile phone including the barcode, which is then scanned by an optical scanning device.

U.S. Pat. No. 7,044,362 issued to Yu discloses an electronic ticketing method and system where tickets can be downloaded onto personal digital assistants and displayed directly for various scanning devices at an event gate.

There is a need for further portable electronic devices, and more specifically, to portable electronic devices having an auxiliary electronic paper display for displaying optically scannable indicia such as for use in electronic ticket handling.

SUMMARY OF THE INVENTION

In a first aspect, the present invention provides a portable electronic device which includes a housing, a first display operably coupled to the housing, and a second display comprising an electronic paper display operably coupled to the housing. A processor is operably coupled to the first display and to the second electronic paper display. A wireless receiver is coupled to the processor for receiving data comprising scannable optical indicia. The processor and the second electronic paper display are operable to display the optically scannable indicia on the second electronic paper display. The second electronic paper display is operable to display the optically scannable indicia with at least one of a lower reflectance, a higher resolution, and a higher contrast compared to display of the optically scannable indicia on the first display.

In a second aspect, the present invention provides a method for displaying scannable optical indicia. The method includes wirelessly receiving data comprising optically scannable indicia from a communications network in the above-noted portable electronic device, and displaying the optically scannable indicia on the electronic paper display.

In a third aspect, the present invention provides an electronic ticketing method which includes purchasing a ticket, wirelessly receiving data associated with the purchased ticket comprising an optically scannable indicia in the above-noted portable electronic device from a communications network, displaying the optically scannable indicia on the second electronic paper display, and optically reading the displayed optically scannable indicia.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

Figure 1:
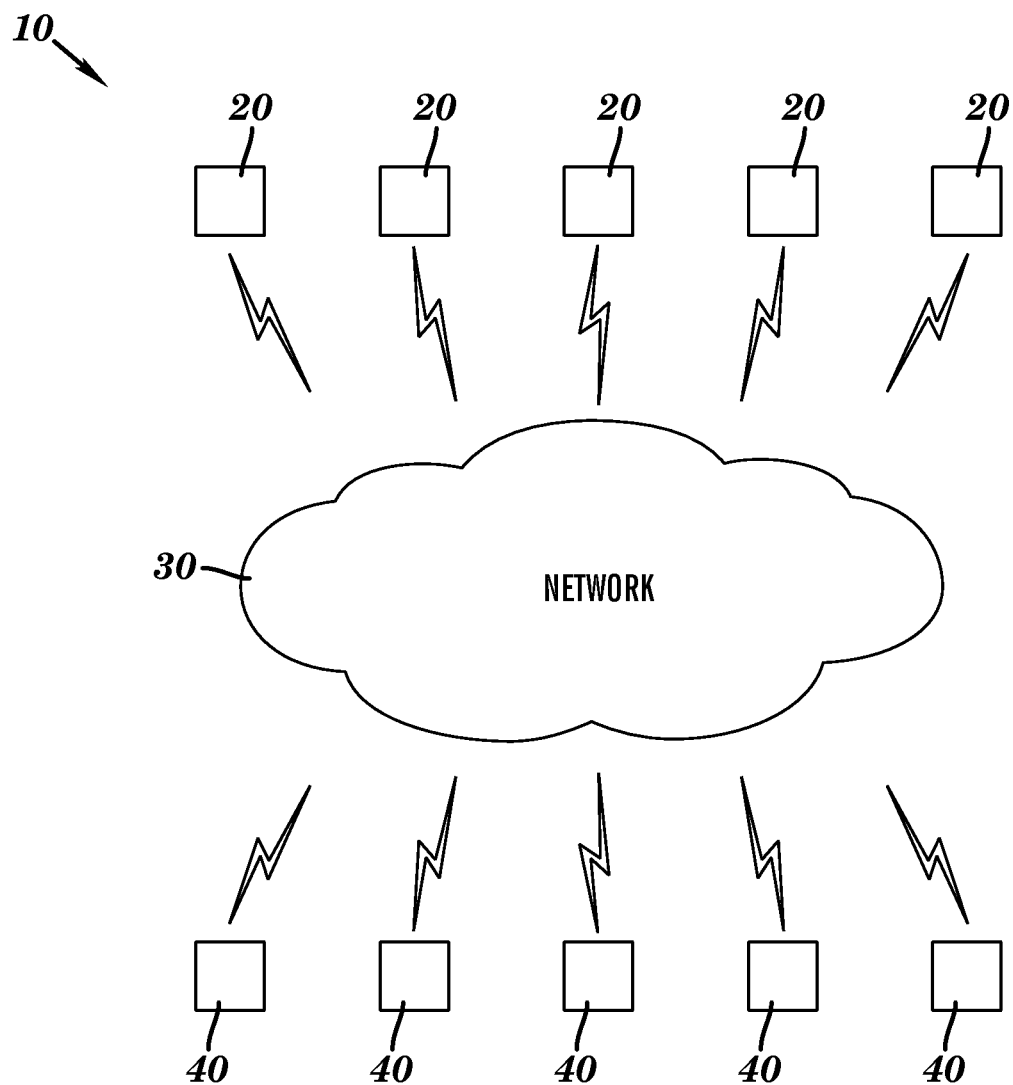
FIG. 1 is a block diagram of one embodiment of a network system for use in electronic ticketing in accordance with an aspect of the present invention.

Reference will now be made in detail to the present invention, examples of which are illustrated in the accompanying drawings, wherein like reference numerals refer to like elements throughout. The following description will use nomenclature associated with a portable electronic devices, however those of ordinary skill in the art will recognize that the present invention is applicable to a variety of portable electronic devices such as cell phones, mobile phones, satellite phones, telemetric devices, personal data assistants (PDAs), and other portable and hand held devices.

As will be described below, various content can be downloaded to the electronic devices such as airline tickets, movie tickets, concert tickets, betting slips, etc. that contain optically scannable indicia such as barcodes that can be read by an optical scanner such as a barcode reader. In one aspect of the present invention, the portable electronic devices may include a plurality of different types of displays, one of which comprises an electronic paper display that is used for displaying the barcodes.

FIG. 1 illustrates a block diagram of one embodiment of network system 10 in accordance with an aspect of the present invention. In this illustrated embodiment, a plurality of portable electronic devices 20 may be operably connected to a communication network 30 such as a cellular telephone network, a global network such as the Internet, or other suitable networks, for communicating with a plurality of entities 40 such as airline companies, ticket sales companies, etc. The communication between portable electronic devices 20 and network 30 is preferably a wireless communication. The communication between network 30 and the plurality of entities 40 may be a wireless communication or a non-wireless communication.

Figure 2:
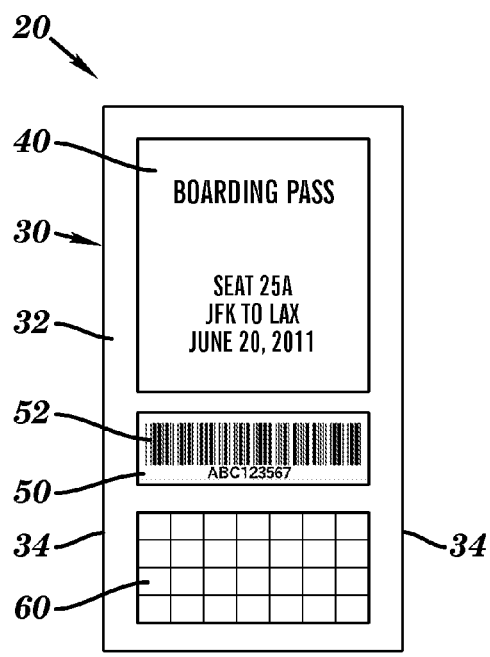
FIG. 2 is a front side elevational view of one embodiment of the portable electronic devices of FIG. 1 having a plurality of displays in accordance with an aspect of the present invention.
Figure 3:
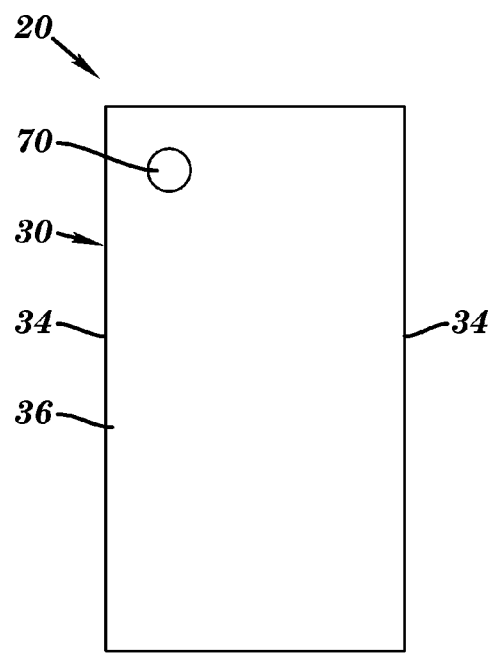
FIG. 3 is a rear side elevational view of the portable electronic device of FIG. 2.

FIGS. 2 and 3 illustrate one embodiment of portable electronic device 20 in accordance with an aspect of the present invention. Exemplary portable electronic device 20 may include a housing 30 having a front surface 32 (FIG. 1), side surfaces 34, and a rear surface 36 (FIG. 2).

With reference to FIG. 2, portable electronic device 20 may further include a first display screen 40 such as a backlit LED or LCD display, and a separate second auxiliary display screen 50, such as an electronic paper display for displaying optically scannable indicia such as a barcode 52. The electronic paper display may include electronic paper displays, e-paper displays, electronic ink displays, and other displays that mimic the appearance of ordinary ink on paper. Unlike conventional backlit flat panel displays, electronic paper displays reflect ambient light like ordinary paper rather than emitting its own light. The display may hold text and images indefinitely without using electricity. The display may include conventional electronic paper technology, for example, one or more electrode layers and a layer comprising a plurality of microscopic beads that change color in response to the charges on the electrode layer. A keyboard 60 enabling the input of data may also be disposed on front side 32 of housing 30. A camera 70 (FIG. 2) may be disposed on the backside of the housing. The housing 12 may also support a variety of components, including a battery typically located the rear half of the body.

Figure 4:
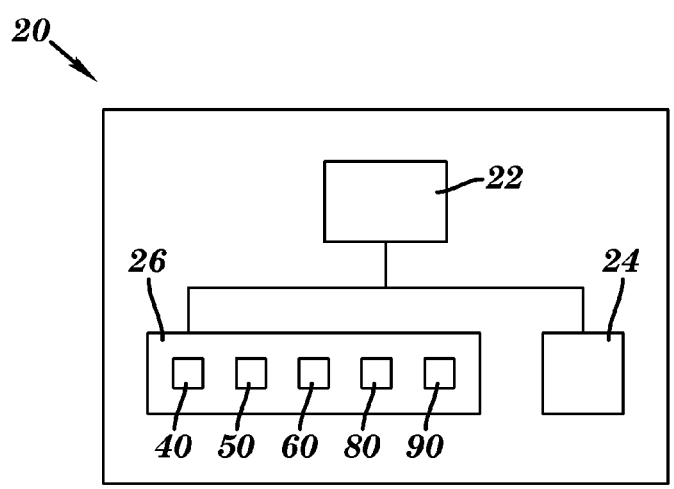
FIG. 4 is a block diagram of the portable electronic device of FIGS. 2 and 3.

As shown in FIG. 4, portable electronic device 20 may include, for example, a computing unit or processor 22, one or more data storage units 24 such as memory or a memory card, and one or more input/output devices 26 such as first display 40, second display 50, keyboard 60, a wireless receiver 80, and a wireless transmitter 90.

Figure 5:
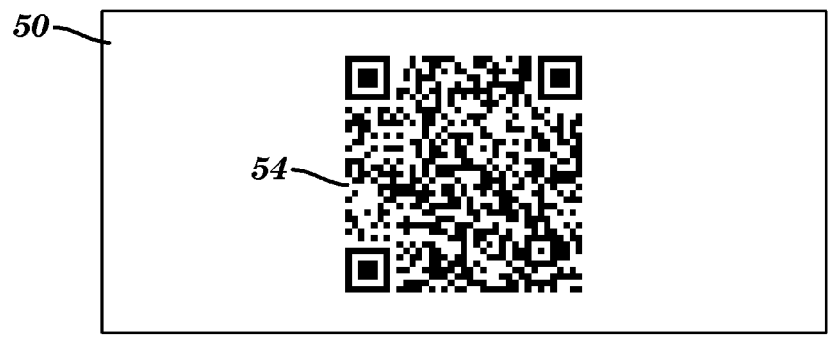
FIG. 5 is a front side elevational view of a portion of the display of the electronic device of FIG. 2 displaying a two dimensional barcode.

With reference again to FIG. 2, display 50 may be operable to display barcode image 52 operable as an optical machine-readable representation of data. The barcode may represent data by varying the widths and spacings of parallel lines, and may be referred to as linear or 1 dimensional (1D). As shown in FIG. 5, display 50 may be operable to display a barcode image 54 operable as an optical machine-readable representation of data. Barcode image 54 may include geometric patterns, rectangles, dots, hexagons and other geometric patterns in 2 dimensions (2D). The above-described barcodes may be provided in a file format, such as portable network graphics (PNG), joint photography experts group (JPG), tagged image file format (TIFF), bitmap (BMP) and graphics interchange format (GIF). Alternatively, the data may be raw data, and such raw data received and processed by the portable electronic device to generate the optical scannable indicia such as a barcode which is displayed on display 50.

As noted above, the barcode is displayed on electronic paper display 50 having at least one of a higher resolution and a lower glare compared to displaying the optically scannable indicia on display 40 such as a backlit display. By doing so, the barcode image may be more easily and accurately read with a barcode reader.

Figure 6:
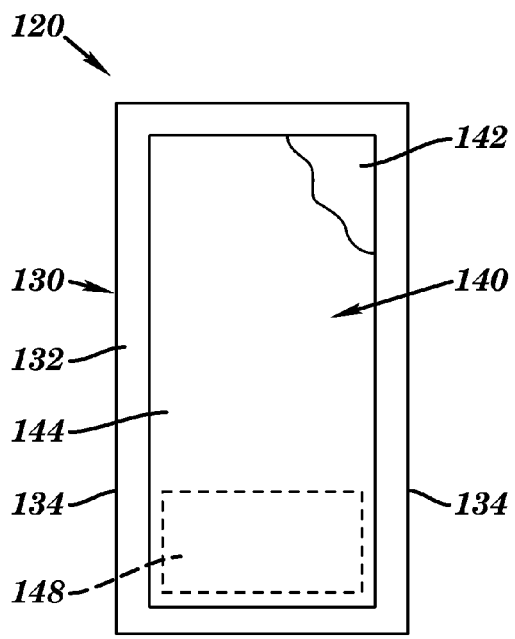
FIG. 6 is a front side elevational view of another embodiment of a portable electronic device, for use in the system of FIG. 1, having a plurality of displays in accordance with an aspect of the present invention.
Figure 7:
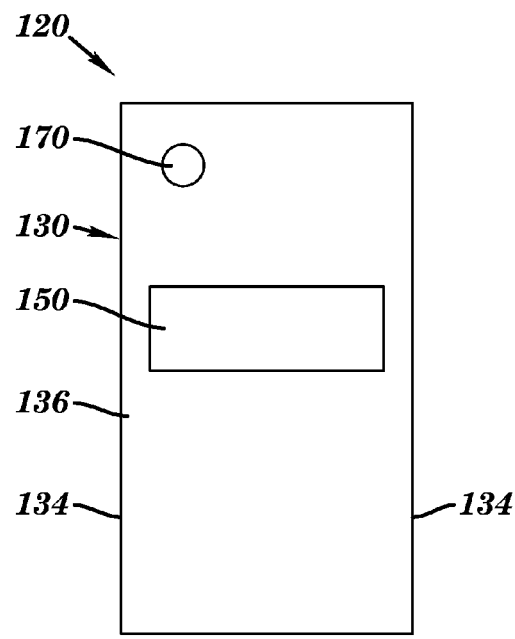
FIG. 7 is a rear side elevational view of the portable electronic device of FIG. 6.

FIGS. 6 and 7 illustrate another embodiment of a portable electronic device 120 in accordance with an aspect of the present invention. Exemplary portable electronic device 120 may include a housing 130 having a front surface 132 (FIG. 6), side surfaces 134, and a rear surface 136 (FIG. 7). Portable electronic device 120 may further include a first display screen 140 (FIG. 6) disposed on the front surface such as a backlit LED or LCD touch screen display, and a separate second display screen 150 (FIG. 7) disposed on the rear surface, such as an electronic paper display for displaying optically scannable indicia such as a barcode. Display screen 140 may comprise a display 142 and a touch sensitive overlay 144 disposed over the display. In this manner, display screen 140 operates as a data input interface. Display screen display 140 may further include a keyboard 148 enabling input of data. A camera 170 (FIG. 7) may be disposed on the backside of the housing. The housing 130 may also support a variety of components, including a battery typically located the rear half of the body. Portable electronic device 120 may also include a graphical user interface, or "GUI", integrated with the display 140. GUI may include a pointer that is moved by an operator to select between various displayed (sometimes referred to as "virtual") control buttons displayed on the display. The pointer may be moved during web browsing to select a text or icon hyperlink control button for highlighting. Control buttons may also be displayed for selecting between various menu options. In one example, the control buttons may be a series of icons. Selecting one of the icons changes the mode of operation of the portable electronic device 120 in accordance with the selected icon. In some embodiments, the portable electronic device 120 may include a pointer controller enabling movement of the pointer. The pointer controller may be provided by an arrow navigation matrix, a trackball or a joystick. In further embodiments, the GUI includes a "virtual" keyboard, thereby obviating the need for additional hardware. Portable electronic device 120 may include, for example, a computing unit or processor, one or more data storage units such as memory or a memory card, and one or more input/output devices such as the first display, the second display, the keyboard, a wireless receiver, and a wireless transmitter.

Figure 8:
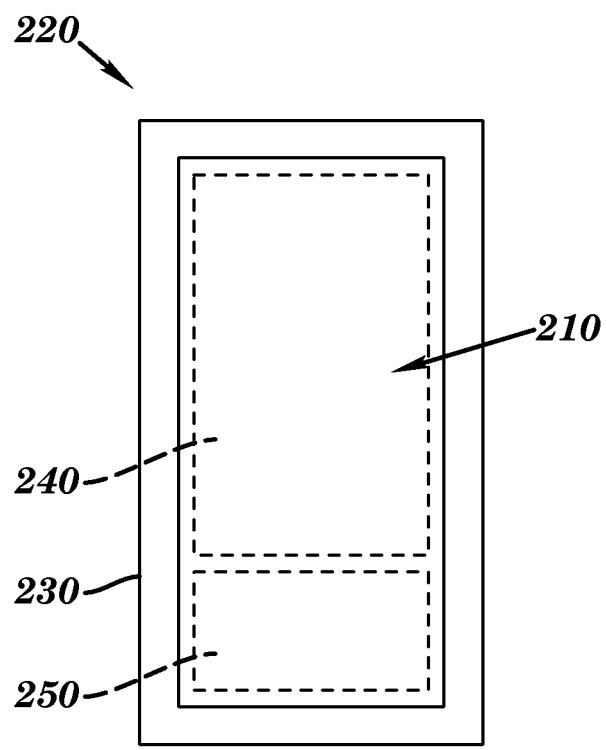
FIG. 8 is a front side elevational view of another embodiment of the portable electronic device, for use in the system of FIG. 1, having a plurality of displays in accordance with an aspect of the present invention.

FIG. 8 illustrates another embodiment of a portable electronic device 220 in accordance with an aspect of the present invention. Exemplary portable electronic device 220 may include a housing 230 having a front surface, side surfaces, and a rear surface (not shown) and the components described in the above portable electronic devices. Portable electronic device 220 may further include a display screen 210 that may be formed or manufactured to include a first display screen 240 such as a backlit LED or LCD touch screen display, and a separate second auxiliary display screen 250 such as an electronic paper display for displaying optically scannable indicia such as barcodes.

Figure 9:
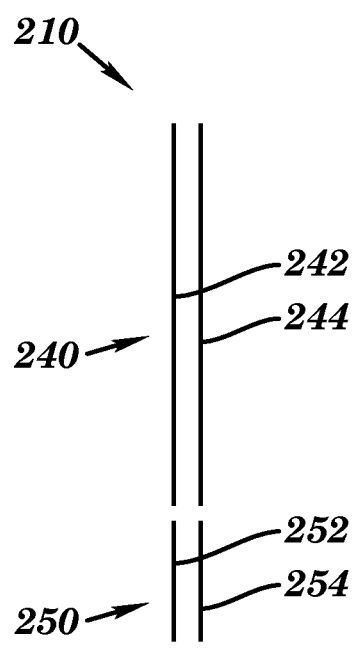
FIG. 9 is a cross-sectional view the displays of FIG. 8.

As shown in FIG. 9, display screen 210 may include a first portion comprising first display screen 240 that may include conventional LED or LCD technology such as a backlit touch screen display 242 and a touch sensitive overlay 244, and a second portion comprising second display screen 250 that may include conventional electronic paper technology, for example, one or more electrode layers 252 and a layer 254 comprising a plurality of microscopic beads that change color in response to the charges on electrode layer 252.

Figure 10:
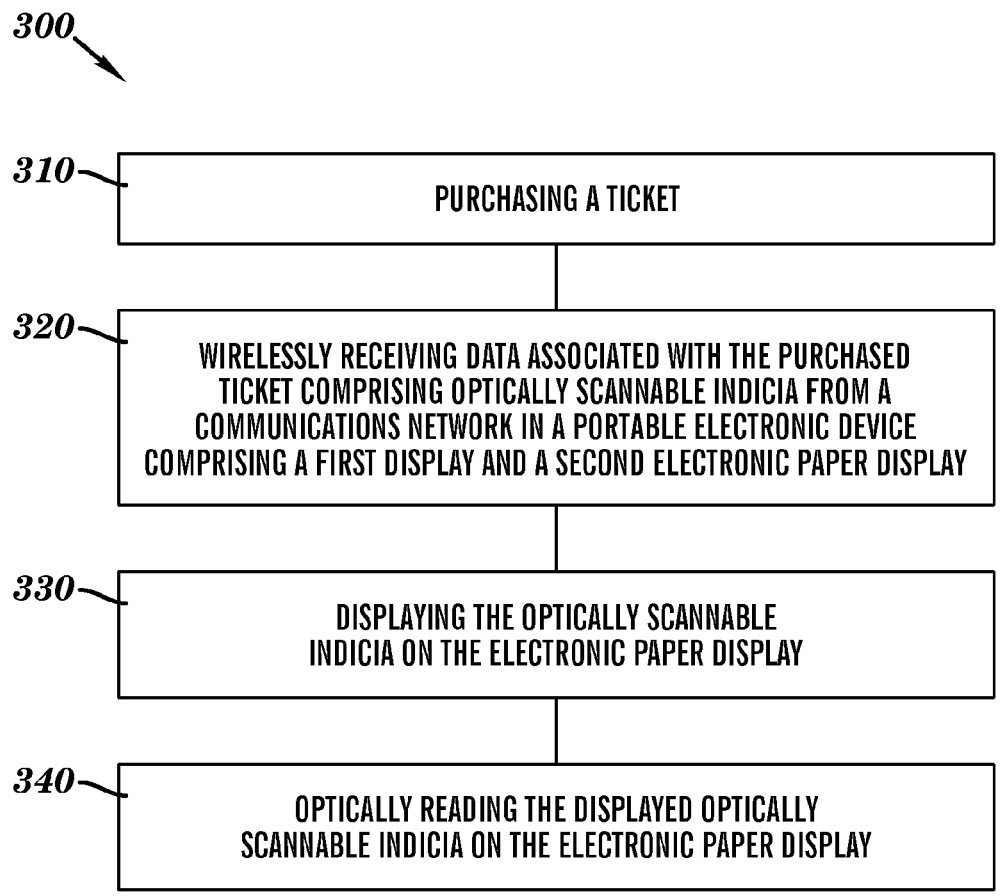
FIG. 10 is a flowchart of an electronic ticketing method in accordance with an aspect of the present invention.

FIG. 10 illustrates an electronic ticketing method 300 which generally includes at 310 purchasing a ticket such as for an event or for an airline ticket. For example, a ticket may be purchased through a box office, travel agent, or a website. Payment may be conventional made using a credit or debit card.

At 320, data associated with the purchased ticket comprising optically scannable indicia is operably sent and wirelessly received from a communications network in a portable electronic device comprising a first display and a second electronic paper display. The data may also include a ticket number, event, date, start time, seat number, etc. The ticket data may also include the mobile phone number or email address of the purchaser, which may also be stored in a database associated with the seller such as entity 40 (FIG. 1).

Figure 11:
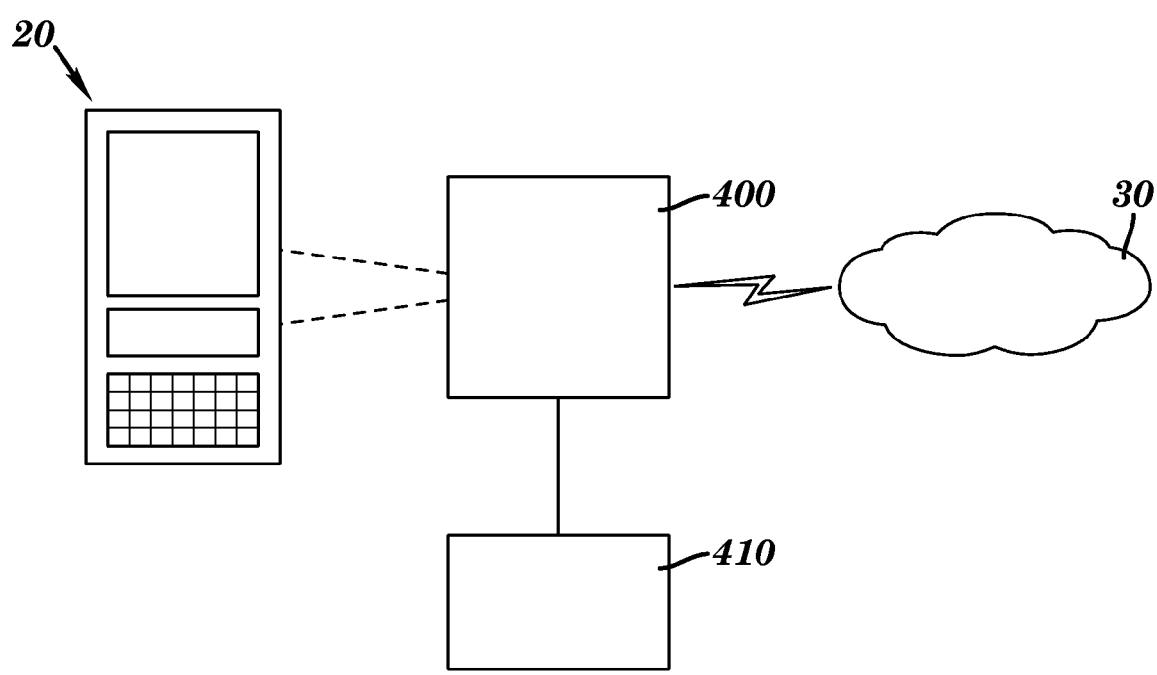
FIG. 11 is a diagrammatic illustration of a process for scanning the barcode from one of the portable electronic devices of FIG. 1 in accordance with an aspect of the present invention.

At 330, for example at the event or upon check-in at an airport, the optically scannable indicia may be displayed on the electronic paper display of the portable electronic device, and at 340, optically read by an optical scanner 400 such as a hand-held scanner connected to a terminal 410, as shown in FIG. 11. Various content can be downloaded to the portable electronic device such as movie tickets, airline tickets, concert tickets, betting slips, etc. that contain barcodes that can be read by a barcode reader. Tags can be added to the content that indicate where the barcode is, and then the barcode label can be segmented from the original content based on the tag so that only the barcode is displayed on the electronic paper display for easy reading by a scanner or a barcode reader.

For example, the processor in the portable electronic device may extract the optically scannable indicia from data associated with an electronic ticket, and display the optically scannable indicia associated with the electronic ticket on the electronic paper display. The supplier of the electronic ticket may provide the tag or other indicia which is used by the processor in the portable electronic device to identify and extract the barcode for display. Alternatively, without a tag or other indicia, the processor may be operable to identify a typical file formats used for barcodes, and extract the file and selectively display the file and the barcode on the electronic paper display instead of, for example, a backlit color display. In addition, the data may be raw data, and such raw data received and processed by the portable electronic device to generate the optical scannable indicia such as a barcode which is displayed on the electronic paper display. It will be appreciated that other means for configuring the electronic ticket, such as by the seller, and means for extracting and displaying the barcode on the auxiliary electronic paper display may be suitably employed.

With reference again to FIG. 11, the terminal 410 may be a personal computer, or other suitable device. The barcode may be operably authenticated by matching the barcode from the scanned barcode against a stored ticket barcode and/or other information stored in a database of the terminal. In other embodiments, the hand held scanner may be may be wirelessly connected, e.g. Bluetooth or WiFi, to the terminal via network 30. For example, optical scanner 400 may employ a barcode reader or barcode scanner comprising a light source, a lens, a light sensor translating optical impulses into electrical data, and a decoder circuitry analyzing the barcode's image data provided by the sensor and sending the barcode's content and/or approval to the scanner's output port. The barcode scanner may employ a laser beam as the light source for reading, for example, 1-dimensional barcodes. A photodiode is used to measure the intensity of the light reflected back from the barcode. For 2-dimensional barcodes, CCD (charge-coupled device) and CMOS (complementary metal oxide semiconductor) readers may be employed which use an array of hundreds of tiny light sensors lined up in a row in the head of the reader. Each sensor measures the intensity of the light immediately in front of it. A voltage pattern of the barcode is generated in the reader for use in authenticating the barcode. Ambient light may be used or the reader may employ a light source. In addition, optical scanner 400 may employ the scanning processes disclosed in U.S. Patent Application Publication No. 2010/0078477 by Wang et al., "Method And Apparatus For Operating Indicia Reading Terminal Including Parameter Determination" which include locating and decoding the optically scannable indicia, the entire contents of this application being incorporated herein by reference.

In the above embodiments, the first display may be located at a first location on the housing and the second auxiliary electronic paper display may be located at a second location spaced-apart and different from the first location. For example, there may be a space or a portion of the housing disposed between adjacent edge portions of the first display and the second electronic paper display.

In the above embodiments, the second electronic paper display may be operable to display the optically scannable indicia with at least one of a lower reflectance, a higher resolution, and a higher contrast compared to display of the optically scannable indicia on the first display. For example, the first display may be provided with a translucent layer, a glass layer, or other material layer such as an outer protective layer. The second electronic paper display may be provided with a layer such as a translucent layer, a glass layer, or other material layer such as an outer protective layer which results in the second electronic display having a lower reflectance compared to the first display. For example, the second electronic paper display may comprise a layer to diffuse reflection of ambient light from the surface of the second electronic paper display. The second electronic paper display may have a lower glare, such as from backlighting or reflection, compared to the first display. In addition, the first display may result in a generally specular reflection in which light from a single incoming direction (a ray) is reflected into a single outgoing direction, whereas the second electronic paper display may result in a diffuse reflection, where incoming light is reflected in a generally broad range of directions.

The second electronic paper display may display the scannable optical indicia having a higher resolution or display resolution such as the number of distinct pixels in each dimension compared to the first direction. The second electronic paper display may display the scannable optical indicia having a higher contrast or difference in visual properties, e.g., the color and brightness, that makes the scannable optical indicia more distinguishable from the background compared to the first display.

From the present description, it will be appreciated by those skilled in the art that the use of an electronic paper display for displaying the barcode overcomes the problem with displays used in conventional mobile phones that have poor resolution, bright surface reflections, and low illumination, making it difficult to read the barcodes from the display. For example, color OLED or LCD displays have pixels made up of three colors, namely red, green, and blue. The combination of these pixel and colors reduce the contrast or the display requiring backlighting to boost the contrast. By employing a secondary or auxiliary electronic paper display in addition to the standard color OLED and LCD displays in portable devices these problems can be overcome. The electronic paper display provides high contrast and low glare so that the barcode can be read easily and accurately with the barcode reader operating normally as it would, for example, when reading regular paper barcode labels.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A portable electronic device comprising:
   a housing;
   a first display operably coupled to said housing;
   a second display operably coupled to said housing, said second display comprising an electronic paper display;
   a processor operably coupled to said first display and to said second electronic paper display;
   a wireless receiver coupled to said processor for receiving data comprising optically scannable indicia;
   said processor and said second electronic paper display operable to display the optically scannable indicia on said second electronic paper display; and
   wherein said second electronic paper display is operable to display the optically scannable indicia with at least one of a lower reflectance, a higher resolution, and a higher contrast compared to display of the optically scannable indicia on said first display; and
   wherein said processor is operable to extract the optically scannable indicia from data associated with an electronic ticket, and selectively display the optically scannable indicia associated with the electronic ticket on said second electronic paper display instead of said first display.

2. The portable electronic device of claim 1 wherein said second electronic paper display comprises lower reflectance for display of the optically scannable indicia compared to display of the optically scannable indicia on said first display.

3. The portable electronic device of claim 1 wherein said second electronic paper display is operable to display the optically scannable indicia with lower reflectance, higher resolution, and higher contrast compared to display of the optically scannable indicia on said first display.

4. The portable electronic device of claim 1 wherein said first display and said second electronic paper display are spaced-apart from each other.

5. The portable electronic device of claim 1 wherein said processor is operable to display the data associated with the electronic ticket relating to the optically scannable indicia on said first display.

6. The portable electronic device of claim 1 wherein said processor is operable to display the optically scannable indicia as at least one of a 1-dimensional barcode and a 2-dimensional barcode.

7. The portable electronic device of claim 1 wherein said processor is operable to display the optically scannable indicia associated with the electronic ticket as a barcode on said second electronic paper display, and operable to display data associated with the electronic ticket relating to the barcode on said first display.

8. The portable electronic device of claim 7 wherein said second electronic paper display comprises lower reflectance for display of the barcode compared to display of the barcode on said first display.

9. The portable electronic device of claim 7 wherein said second electronic paper display is operable to display the barcode with lower reflectance, higher resolution, and higher contrast compared to display of the barcode on said first display.

10. The portable electronic device of claim 1 wherein said first display comprises a backlit display.

11. The portable electronic device of claim 1 wherein said first display comprises a touch screen display.

12. The portable electronic device of claim 1 wherein said housing comprises a front side and a rear side, and said first display and said second electronic paper display are disposed on said front side.

13. The portable electronic device of claim 1 wherein said portable electronic device comprises a mobile phone.

14. The portable electronic device of claim 1 further comprising a keyboard operably coupled to said housing and to said processor.

15. The portable electronic device of claim 1 wherein said portable electronic device is operable to extract the optically scanning indicia based on tags of a barcode.

16. The portable electronic device of claim 1 wherein said portable electronic device is operable to extract the optically scannable indicia based on identification of a format used for a barcode.

17. A method for displaying optically scannable indicia, the method comprising:
    wirelessly receiving data comprising the optically scannable indicia associated with an electronic ticket from a communications network in a portable electronic device having a first display and a second electronic paper display;
    extracting the optically scannable indicia associated with the electronic ticket from the data; and
    selectively displaying the optically scannable indicia associated with the electronic ticket on the second electronic paper display instead of the first display.

18. The method of claim 17 wherein the wirelessly receiving data comprises wirelessly receiving data relating to the optically scannable indicia, and further comprising displaying the information relating to the optically scannable indicia on the first display.

19. The method of claim 17 wherein the displaying the optically scannable indicia on the electronic paper display comprises displaying at least one of a 1-dimensional barcode and a 2-dimensional barcode.

20. The method of claim 17 further comprising optically reading the optically scannable indicia displayed on the second electronic paper display.

21. The method of claim 17 wherein the extracting comprises extracting based on tags of the electronic ticket associated data.

22. The method of claim 17 wherein the extracting comprises extracting based on identification of a format for a barcode.

23. An electronic ticketing method comprising:
    purchasing a ticket;
    wirelessly receiving data associated with the purchased ticket comprising optically scannable indicia in a portable electronic device from a communications network, the portable electronic device comprising a first display and a second electronic paper display;
    extracting the optically scannable indicia from the data associated with the purchased ticket;
    selectively displaying the optically scannable indicia on the second electronic paper display instead of the first display; and
    optically reading the displayed optically scannable indicia.

24. The method of claim 23 wherein the displaying the optically scannable indicia on the second electronic paper display comprises displaying at least one of a 1-dimensional barcode and a 2-dimensional barcode.

25. The method of claim 23 wherein the optically scannable indicia is associated with an airline ticket.

26. The method of claim 23 wherein the extracting comprises extracting based on tags of the data associated with the purchased ticket.

27. The method of claim 23 wherein the extracting comprises extracting based on identification of a format for a barcode.

\* \* \* \* \*